H. A. RISHEL.
AUTOMOBILE RADIATOR SHIELD.
APPLICATION FILED DEC. 4, 1916.
1,298,094.
Patented Mar. 25, 1919.
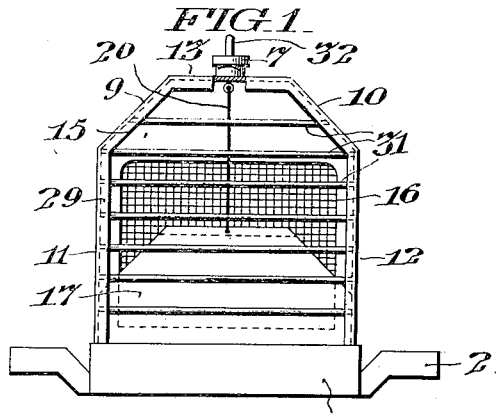
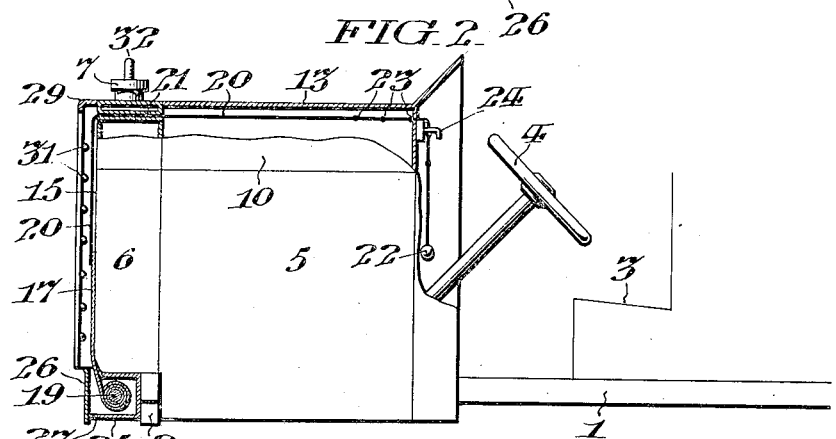
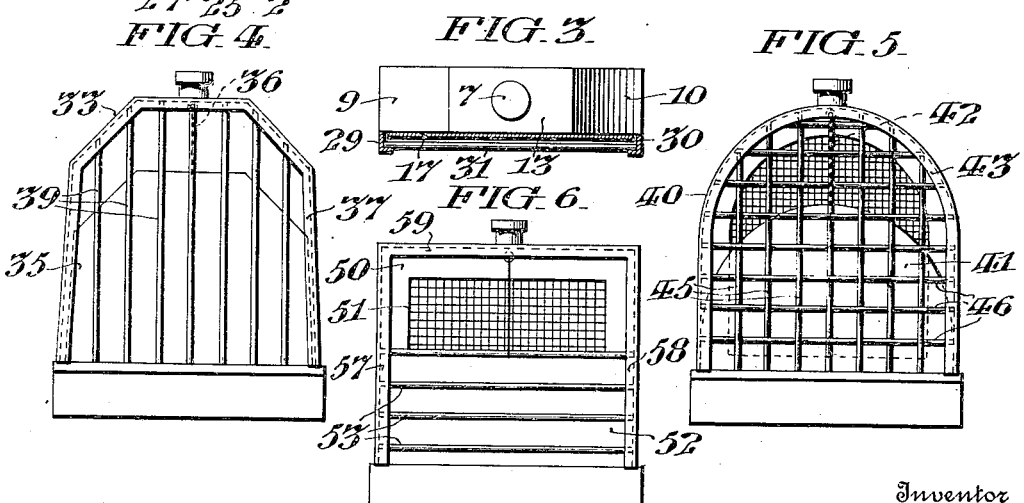
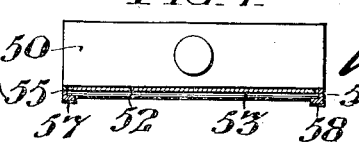
Inventor
Harry A. Rishel,

UNITED STATES PATENT OFFICE.

HARRY A. RISHEL, OF PHILADELPHIA, PENNSYLVANIA.

AUTOMOBILE-RADIATOR SHIELD.

1,298,094. Specification of Letters Patent. Patented Mar. 25, 1919.

Application filed December 4 1916. Serial No. 134,962.

*To all whom it may concern:*

Be it known that I, HARRY A. RISHEL, a citizen of the United States, residing at Philadelphia, in the county of Philadelphia and State of Pennsylvania, have invented certain new and useful Improvements in Automobile-Radiator Shields, of which the following is a specification.

My invention relates particularly to automobiles having motors which are arranged to be cooled by a radiator disposed forward of the motor casing and dependent upon air currents passing through a reticulated opening in face of the radiator, and is especially directed to means for controlling said opening.

The principal objects of my invention are to provide an automobile with means for guiding an adjustable shield or curtain across the opening, in the front of the radiator in position to control the ingress of air currents to the interior thereof.

Other objects of my invention are to provide a housing for said radiator shield, so disposed and arranged as to be convenient and inconspicuous, and affording ready access to the shield housed therein.

My invention comprehends means for preventing the corners of a shield or curtain of irregular outline from falling away from the face of the radiator.

Specifically stated the form of my invention as hereinafter described comprises an automobile radiator having a perimetral guide for the radiator shield, provided with spaced bars, between which and the radiator face said shield is arranged to vary the area of said opening.

My invention also includes all of the various novel features of construction and arrangements as hereinafter more definitely specified.

In the accompanying drawings Figure 1 is a front elevational view of an automobile radiator embodying a convenient form of my invention; Fig. 2 is a fragmentary side elevational view of an automobile showing the engine casing and radiator associated therewith, such as is illustrated in Fig. 1; Fig. 3 is a sectional plan view of the radiator shown in Figs. 1 and 2 showing the shield and its guiding means in section; Fig. 4 is a front elevational view of an automobile radiator embodying a modification of my invention; Fig. 5 is a similar view showing another modification of my invention; Fig. 6 is a front elevational view showing another embodiment wherein the bars are carried by the shield and Fig. 7 is a sectional plan view of the form of my invention shown in Fig. 6.

In said figures the automobile comprises the longitudinal and transverse frame bars 1 and 2 respectively, the seat 3, hand wheel 4, engine casing 5 and radiator 6 having the filler cup 7; the upper portion of said engine casing and radiator being broken away for convenience of illustration.

In the form of my invention shown in Figs. 1, 2 and 3, the upper corners of the engine casing and radiator are cut away and provide inclined walls 9 and 10 sloping upwardly from parallel walls 11 and 12 to the flat horizontal wall 13 forming the top.

The front wall 15 of the radiator is provided with the usual reticulated opening 16 to admit cooling air currents, and said opening 16 is arranged to be controlled by the shield or curtain 17 mounted upon the spring roller 19, which tends to wind said curtain thereon and against the action of which said curtain is actuated by the cord or chain 20 passing through the tubular passageway 21 in the radiator and through the engine casing 5 to the operator's position.

As shown in Fig. 2 the cord or chain 20 is provided with the knob 22 by which it may be conveniently grasped by the operator and is also provided with a series of buttons 23 by which it may be engaged with the hook or catch 24, which may be preferably bifurcated, to variably hold the curtain 17 in selected positions. The curtain roller is preferably disposed beneath the radiator as illustrated in Fig. 2, in a housing 25, shown in section in said figure and provided with a removable closure 26, and drain outlets 27 in its floor.

In order that the curtain 17 which is necessarily formed of flexible material may not be disturbed and blown from the radiator face by sudden blasts of air directed laterally, a guide is provided between which and the radiator, the curtain may be adjusted. Said guide comprises frame 29 of angle bars extending forwardly from the perimeter of the radiator 6 and providing ways 30 in which the edges of the curtain may slide, the lateral bars of said frame 29 being connected by a plurality of transversely extended bars 31 carried thereby as shown in Figs. 1, 2 and 3, forming a grating and preventing the displacement of said curtain 17.

The radiator may be maintained at any desired temperature by adjusting the curtain 17 to vary the area of the radiator opening, and said temperature may be indicated to the operator by a suitably disposed thermometer 32 which may be conveniently mounted in the filler cap 7 as shown in Figs. 1 and 2, or elsewhere as desired.

In the form of my invention shown in Fig. 4, the radiator 33 is shielded by the curtain 35 which is arranged to be adjusted by the cord or chain 36 between the face of the radiator 33 and the guide comprising the channel or angle bar frame 37, and the bars 39 which extend vertically, being carried by the transverse bars of said frame and constituting a grating.

In the form of my invention shown in Fig. 5 the radiator 40 which is formed with a semicircular top is shielded by the curtain 41, which is arranged to be adjusted by the cord or chain 42 between the face of the radiator 40 and the guide comprising the channel or angle bar frame 43 and the bars 45 and 46 respectively extending vertically and transversely to form a grating of open mesh work by being interwoven.

The form of my invention illustrated in Figs. 6 and 7 provides an automobile radiator 50 having a reticulated opening 51 which is arranged to be shielded by the curtain 52 carrying transverse space bars 53 constituting a movable grating and whose ends are arranged to slide in, and be guided by the ways 55 and 56 formed by the angle bars 57 and 58 providing a perimetral frame 59 projecting forwardly from the face of said radiator 50.

It may be here noted that the guiding bars illustrated in the drawing and forming a cage or grating for guiding the curtain in operative engagement with the face of the radiator, may be formed of wire, being greatly exaggerated in the drawing for convenience of illustration.

I do not desire to limit my invention to the precise details of construction and arrangement herein set forth as it is obvious that various modifications may be made therein without departing from the essential features of the invention as defined in the appended claim.

Having thus described my invention, I claim:—

An automobile radiator shield comprising the combination of a frame adapted to extend forwardly of the perimeter of the radiator and provided with confronting ways, a rollable flexible curtain marginally coöperating with the ways, means including a roller for operating the curtain, and a grating extending across the frame and supported thereby to prevent the curtain from bulging.

In testimony whereof I have hereunto set my hand in the presence of two subscribing witnesses.

HARRY A. RISHEL.

Witnesses:
L. T. GILBERT,
WM. F. ELLWANGER.